Aug. 21, 1945.    R. W. FERRIS    2,383,119
DEMOUNTABLE ROTOR
Filed April 4, 1944    2 Sheets-Sheet 1

Inventor
ROY W. FERRIS,
By Clarence A. O'Brien
and Harvey B. Jacobson
Attorneys

Aug. 21, 1945.     R. W. FERRIS     2,383,119
DEMOUNTABLE ROTOR
Filed April 4, 1944     2 Sheets-Sheet 2

Inventor
Roy W. Ferris,

By Clarence A. O'Brien
and Harvey B. Jacobson
Attorneys

Patented Aug. 21, 1945

2,383,119

UNITED STATES PATENT OFFICE 2,383,119

DEMOUNTABLE ROTOR

Roy W. Ferris, Muskegon Heights, Mich.

Application April 4, 1944, Serial No. 529,522

3 Claims. (Cl. 287—53)

This invention relates to new and useful improvements in wheel fastening means for vehicles and machinery and more particularly to a demountable wheel which can be quickly applied to and removed from a wheel hub and/or to a demountable pulley or gear which can be quickly applied to and removed from a shaft on any machine.

An important object of the present invention is to provide a fastening mechanism for demountable wheels, pulleys, gears or similar objects of propulsion which will eliminate the customary use of nuts and bolts and provides latch members which operate in unison and in a positive acting and substantially fool-proof manner.

Other objects and advantages of the invention will become apparent to the reader of the following description.

Figure 1:
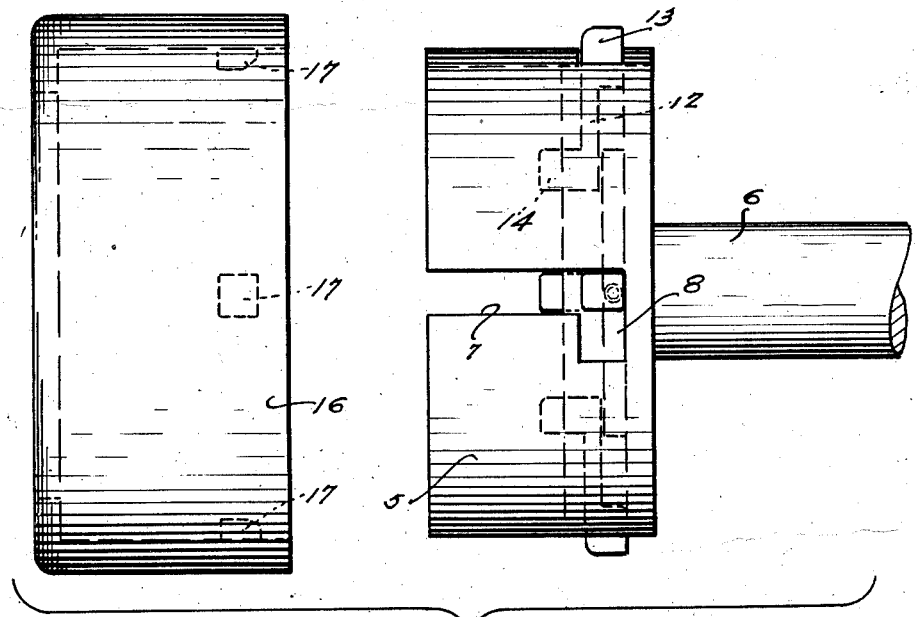
Figure 1 represents a fragmentary exploded side elevational view showing the drum and sleeve assembly.
Figure 2:
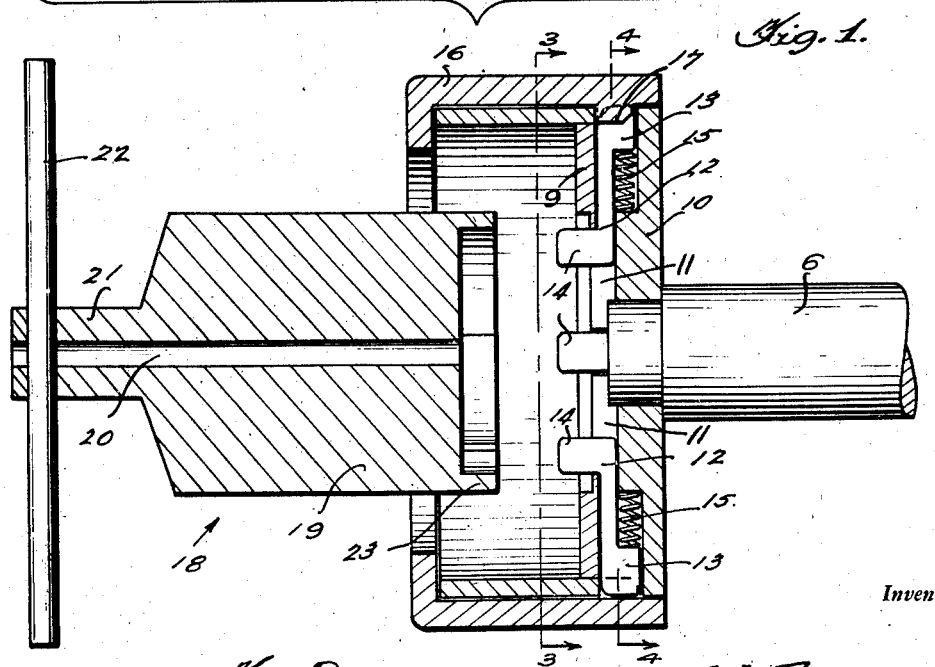
Figure 2 is a longitudinal sectional view of the assembled structure.
Figure 3:
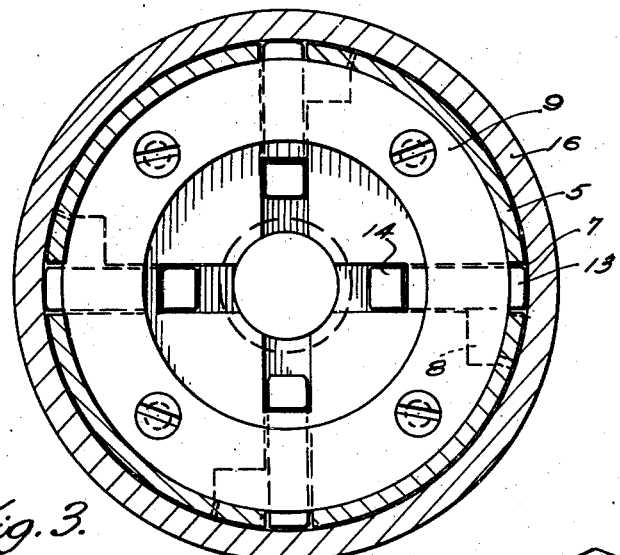
Figure 3 is a cross section on the line 3—3 of Figure 2.

Referring to the drawings wherein like numerals refer to like parts, it can be seen that numeral 5 denotes a drum secured to a wheel axle or the like 6 in any suitable manner.

This drum has bayonet slots consisting in inwardly disposed slots 7 formed with laterally disposed extensions 8 at their inner ends.

Figure 4:
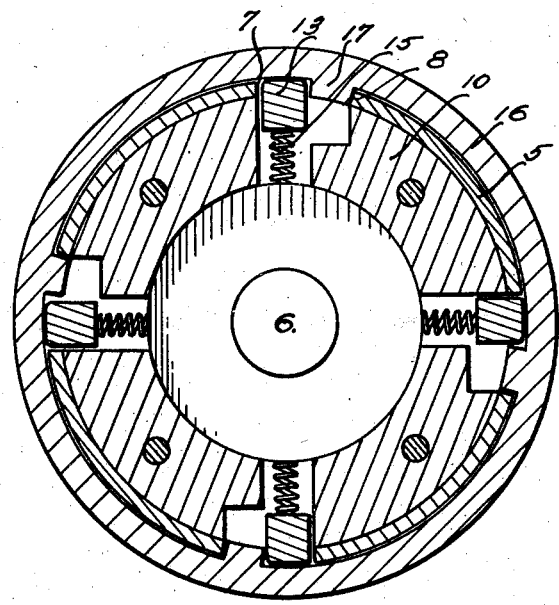
Figure 4 is a cross sectional view on the line 4—4 of Figure 2.
Figure 5:
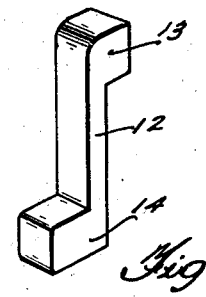
Figure 5 is a perspective view of one of the latch members.
Figure 6:
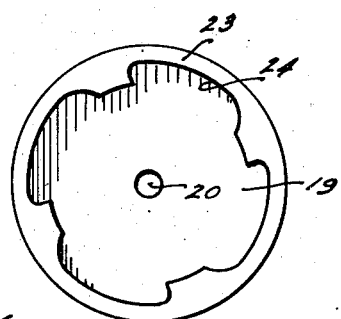
Figure 6 is an end elevational view of the unlocking tool.

As can be seen in Figure 4, between a plate 9 and the back wall 10 of the drum 5 radially disposed slideways 11 are located and serve to slidably receive latch members 12 having oppositely disposed lugs 13 and 14 at their outer and inner ends. Interposed between the inner side of each lug 13 and the inner end of the corresponding slideway 11 is a coiled compression spring 15, serving to urge the corresponding latch member outwardly and into the inner end of the corresponding slot 7, as shown in Figures 1 and 4.

A sleeve upon which a wheel or belt (not shown) may be mounted is denoted by numeral 16 and the inside of this sleeve has a plurality of circumferentially spaced studs 17 which are adapted to slide in the slot 7 and the slot extensions 8 when the sleeve 16 is applied over the drum 5 and rotated. The application of the sleeve is accomplished by applying the sleeve 16 to full depth over the drum 5 and then rotating the sleeve 16 so that drum 5 and sleeve 16 lock automatically. The automatic locking is effected by rotating the sleeve 16 to move the studs 17 over and past the lugs 13 of the latch members 12 into a position between said lugs 13 and the outer ends of the slot extensions 8. In this operation, the studs 17 wipe over said lugs 13, the latch members 12 moving inwardly in opposition to the springs 15. When the studs 17 are properly positioned in the lateral slot extensions 8, the latch members 12 move outwardly so that the lugs 13 obstruct the slots 7 to prevent return of the studs 17, and thus the wheel or sleeve cannot become displaced from the drum 5 until the tool 18 is used.

The tool 18 consists of a cylindrical body 19 preferably having a bore 20 therethrough and through a short reduced neck 21. A transverse opening is formed in the neck 21 to accommodate a hand bar 22. The inner end of the body 19 is hollowed out to define an apron 23 which has its inner faces formed with cam surfaces 24 adapted to ride the lugs 14 at the inner end of the latch members 12. Obviously, by rotating the tool 18, the latch members 12 are contracted, drawing the lugs 13 well into the slideways 11, so that the sleeve 16 can be rotated and disengaged by rotating sleeve 16 in the opposite direction from that used in locking, until the studs 17 can move out of slot extension 8 into slot 7 and then when the sleeve 16 is pulled off from drum 5 the studs 17 slide back along slots 7 until the sleeve is disengaged from the drum.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A demountable rotor comprising a hub forming drum having peripheral bayonet slots therein provided with outer ends opening onto one edge of the drum, a sleeve fitting over the drum, internal lugs on said sleeve fitting in the inner ends of said slots, and radial latches in said drum, spring pressed into said slots between said lugs and said outer ends of the slots, said latches being slidable to retract the same out of the slots.

2. A demountable rotor comprising a hub forming drum having peripheral bayonet slots therein provided with outer ends opening onto one edge of the drum, a sleeve fitting over the drum, internal lugs on said sleeve fitting in the inner ends of said slots, and radial latches in said drum, spring pressed into said slots between said lugs and said outer ends of the slots, said latches being slidable to retract the same out of the slots, said drum having an annular plate therein forming with one side of the drum slideways for said latches.

3. A demountable rotor comprising a hub forming drum having peripheral bayonet slots therein provided with outer ends opening onto one edge of the drum, a sleeve fitting over the drum, internal lugs on said sleeve fitting in the inner ends of said slots, and radial latches in said drum, spring pressed into said slots between said lugs and said outer ends of the slots, said latches being slidable to retract the same out of the slots, said drum having an annular plate therein forming with one side of the drum slideways for said latches, said latches having inner right angled ends extending out of said plate and for use in retracting the latches.

ROY W. FERRIS.